(12) United States Patent
Childs

(10) Patent No.: US 12,396,404 B2
(45) Date of Patent: Aug. 26, 2025

(54) REPOSITIONABLE WINDGUARD ASSEMBLY FOR AGRICULTURAL BALER FEEDER SYSTEM

(71) Applicant: CNH Industrial America LLC, New Holland, PA (US)

(72) Inventor: Albert Childs, Meadville, PA (US)

(73) Assignee: CNH Industrial America LLC, New Holland, PA (US)

( * ) Notice: Subject to any disclaimer, the term of this patent is extended or adjusted under 35 U.S.C. 154(b) by 864 days.

(21) Appl. No.: 17/589,387

(22) Filed: Jan. 31, 2022

(65) Prior Publication Data
US 2023/0276738 A1 Sep. 7, 2023

(51) Int. Cl.
*A01F 15/10* (2006.01)
*A01F 15/07* (2006.01)

(52) U.S. Cl.
CPC ............ *A01F 15/106* (2013.01); *A01F 15/07* (2013.01); *A01F 2015/107* (2013.01)

(58) Field of Classification Search
CPC .. A01F 15/106; A01F 15/07; A01F 2015/107; A01F 15/10; A01D 89/008
See application file for complete search history.

(56) References Cited

U.S. PATENT DOCUMENTS

| | | | |
|---|---|---|---|
| 2,481,244 A * | 9/1949 | Russell | A01F 15/10 198/817 |
| 2,872,772 A * | 2/1959 | Nolt | A01D 89/008 56/364 |
| 3,924,391 A * | 12/1975 | Cheatum | A01F 15/08 56/364 |
| 4,411,127 A | 10/1983 | Diederich, Jr. et al. | |
| 4,516,389 A * | 5/1985 | Core | A01F 15/106 56/190 |
| 6,295,797 B1 | 10/2001 | Naaktgeboren et al. | |
| 6,877,304 B1 * | 4/2005 | Smith | A01F 15/106 56/364 |
| 7,107,748 B2 * | 9/2006 | McClure | A01D 89/008 56/190 |
| 7,650,741 B2 | 1/2010 | Graber et al. | |
| 7,654,069 B1 | 2/2010 | Dunham et al. | |
| 8,751,115 B2 | 6/2014 | Derscheid | |

(Continued)

FOREIGN PATENT DOCUMENTS

| | | | | |
|---|---|---|---|---|
| DE | 102008041331 A1 * | 2/2010 | | A01D 89/008 |
| EP | 0339733 A1 | 11/1989 | | |

(Continued)

OTHER PUBLICATIONS

Extended European Search Report for EP Application No. 23153957.8 dated Jul. 5, 2023 (seven pages).

*Primary Examiner* — Arpad Fabian-Kovacs
(74) *Attorney, Agent, or Firm* — CM Law PLLC; Stephen J. Weed

(57) ABSTRACT

An agricultural machine includes: a machine frame; and a feeder system coupled with the machine frame and including a windguard assembly, the windguard assembly being configured for selectively occupying a first position and a second position, the first position being associated with a normal flow direction of a crop material relative to the feeder system, the second position being associated with a reversal of the normal flow direction of the crop material.

12 Claims, 7 Drawing Sheets

(56) References Cited

U.S. PATENT DOCUMENTS

| | | | |
|---|---|---|---|
| 9,681,603 B2 | 6/2017 | McClure et al. | |
| 10,111,387 B1 * | 10/2018 | Derscheid | A01D 89/008 |
| 11,547,053 B2 * | 1/2023 | Lammerant | A01D 89/008 |
| 11,700,793 B2 * | 7/2023 | Tacke | A01F 15/101 |
| | | | 100/142 |
| 12,063,892 B2 * | 8/2024 | Babler | A01D 75/187 |
| 12,089,536 B2 * | 9/2024 | Childs | A01D 89/008 |
| 2006/0277888 A1 * | 12/2006 | Erdmann | A01D 89/008 |
| | | | 56/344 |
| 2008/0163600 A1 * | 7/2008 | Schrag | A01D 89/008 |
| | | | 56/341 |
| 2008/0264028 A1 | 10/2008 | Woodford | |
| 2013/0167500 A1 * | 7/2013 | Kuhn | A01D 89/002 |
| | | | 56/364 |
| 2014/0250855 A1 * | 9/2014 | Vandamme | A01D 89/008 |
| | | | 56/379 |
| 2021/0274716 A1 | 9/2021 | Lammerant et al. | |
| 2023/0240188 A1 * | 8/2023 | Childs | A01F 15/10 |
| | | | 56/190 |

FOREIGN PATENT DOCUMENTS

| | | | | |
|---|---|---|---|---|
| EP | 0403899 A1 * | 12/1990 | | A01D 75/187 |
| EP | 2067399 A1 | 6/2009 | | |
| EP | 2156729 A2 * | 2/2010 | | A01D 89/008 |
| EP | 2777379 B1 * | 12/2016 | | A01D 34/001 |
| EP | 3912456 A1 | 11/2021 | | |

* cited by examiner

REPOSITIONABLE WINDGUARD ASSEMBLY FOR AGRICULTURAL BALER FEEDER SYSTEM

FIELD OF THE INVENTION

The present invention pertains to an agricultural baler, and, more specifically, to a windguard assembly of the agricultural baler.

BACKGROUND OF THE INVENTION

Agricultural harvesting machines, such as agricultural balers (which can be referred to as balers), have been used to consolidate and package crop material (which can also be referred to as forage, forage material, or forage crop material) so as to facilitate the storage and handling of the crop material for later use. Often, a mower-conditioner cuts and conditions the crop material and forms it into a swath or windrow to dry in the sun. When the cut crop material is properly dried (depending upon the application), an agricultural harvesting machine, such as an agricultural baler, travels along the swath or windrows (hereinafter, collectively referred to as windrows, unless otherwise specified) to pick up the crop material. Agricultural balers can be, for example, round balers, large square balers, and small square balers, which form the bales into corresponding shapes, as is known.

More specifically, with respect to round balers, pickups of the baler gather the cut and windrowed crop material from the ground, and then convey the cut crop material toward a bale-forming chamber within the baler (that is, the bale chamber). A drive mechanism operates to activate any pickups of a pickup assembly, augers, and/or a rotor (which can be referred to as a feeder) of a rotary feeder assembly of a feeder system. A pickup can convey crop material in an overshot manner, while a rotor can convey crop material toward or into the bale chamber in an undershot manner. A conventional bale chamber of a round baler may include a pair of opposing sidewalls with a series of rolls (which can be referred to as rollers) and belts that rotate and compress the crop material into a cylindrical shape. When the bale has reached a desired size and density, a wrapping assembly, which includes wrap material, may wrap the bale to ensure, at least in part, that the bale maintains its shape and density. The wrap material can include a film (such as a flexible plastic wrap) or a net (which can be referred to as net wrap). For example, wrap material may be used to wrap the bale of crop material. After wrapping, a cutting or severing mechanism of the wrapping assembly may be used to cut the wrap material once the bale has been wrapped. The wrapped bale may be ejected from the baler and onto the ground by, for example, raising a tailgate of the baler. The tailgate is then closed, and the cycle repeated as necessary and desired to manage the field of cut crop material.

The feeder system can include not only the pickup assembly and the rotor assembly, for example, but also a floor, a cutting assembly, and a windguard assembly. The pickup includes a plurality of tines to pick up the crop material disposed in a windrow. The rotor, which is downstream of the pickup, can be positioned above the floor which the crop material traverses prior to entering the bale chamber and can work in conjunction with, and cooperatively with, the cutting assembly. The rotor can include a rotor shaft (extending transversely) and a plurality of tines (which can have a generally triangular or star-shaped configuration) spaced apart across the transverse extent of the baler. The tines are configured to engage and thereby to push the crop material towards the bale chamber and can be grouped in pairs, with a relatively short distance between the tines of a given pair. The floor can include a plurality of slots across the transverse extent of the floor, each slot extending longitudinally in the floor (that is, parallel or otherwise aligned with a direction of crop flow). The cutting assembly can include a plurality of knives (which can also be referred to as cutters) which are selectively received in the slots of this floor, respectively. When inserted through the slots so that the knives extend at least partially above the floor, each respective knife (depending upon the design) can extend between a pair of tines of the rotor, as the rotor shaft rotates the tines. Further, the knives, as they extend through the slots above the floor are configured to cut the crop material to a predetermined length, as the crop material passes by the knives prior to the crop material entering the bale chamber. These knives can be configured to drop at least partially below the floor upon being struck by a foreign object. The windguard assembly can include a roller and a plurality of tines extending aft and can be configured to retain the crop material along at least a part of its flow path as it proceeds rearward by the pickup and the rotor to the bale chamber and, in so doing, can be positioned adjacent to an upper portion of the crop material. Further, the windguard assembly can be pivotably attached to the pickup assembly.

Occasionally, such as with round balers, the crop material becomes plugged in the feeder system. That is, the crop material bunches up so as to form a plug of crop material (which can be referred to as a crop plug), which does not allow, or otherwise at least partially inhibits, the crop material from flowing from the feeder system into the bale chamber. Round balers prone to plugging can have a variable position (drop) floor below the rotor (also known as the feeder) that allows the crop plug to be passed, by increasing a space between the floor and the rotor. Such a drop floor can be effective in unplugging if only the rotor is plugged but often is not effective for unplugging when the crop material is plugged between the windguard assembly and the pickup (resulting in a pickup plug). Such a plug can result, for example, when an operator's ground speed has exceeded the feeding capacity of the baler. When a plug of crop material occurs that cannot be cleared by the drop floor, some operators may use a manually or remotely operated rotor reverser of a reversing system (so as to reverse a direction of the flow of the crop material), which can be useful in loosening the crop material but typically is unable to clear a pickup entirely. The reversing system cannot effectively clear a pickup plug because a conventional construction of windguard assembly geometry acts as a barrier, preventing the flow of the crop material in the reverse direction. For, the tines of the windguard assembly act as barbs, jamming the crop material and thus stopping the reverse flow of crop material and preventing the crop from clearing. Manual removal of the plug, thus, is often necessary for a pickup plug, which often requires the operator to remove the windguard assembly and to pull the crop material out of the pickup assembly by hand-a timely, labor-intensive job which often occurs in uncomfortable field conditions (heat, bugs, dust).

What is needed in the art is a way to reposition the windguard to facilitate removal of a plug of crop material from a feeder system when a drop floor is insufficient to do so, without having to clear the plug manually.

SUMMARY OF THE INVENTION

The present invention provides an agricultural baler with a feeder system including a windguard assembly configured for selectively moving between a plurality of positions, such that a plug of crop material can be removed from the feeder system when the flow direction of the crop material in the feeder system is reversed.

The invention in one form is directed to a windguard assembly of a feeder system of an agricultural baler, the agricultural baler including a baler frame, the feeder system being coupled with the baler frame, the windguard assembly including: the windguard assembly, which is configured for selectively occupying a first position and a second position, the first position being associated with a normal flow direction of a crop material relative to the feeder system, the second position being associated with a reversal of the normal flow direction of the crop material.

The invention in another form is directed to an agricultural machine, including: a machine frame; and a feeder system coupled with the machine frame and including a windguard assembly, the windguard assembly being configured for selectively occupying a first position and a second position, the first position being associated with a normal flow direction of a crop material relative to the feeder system, the second position being associated with a reversal of the normal flow direction of the crop material.

The invention in yet another form is directed to a method of using an agricultural baler, the method including the steps of: providing a baler frame and a feeder system, the feeder system being coupled with the baler frame and including a windguard assembly; occupying selectively, by the windguard assembly, a first position, the first position being associated with a normal flow direction of a crop material relative to the feeder system; and occupying selectively, by the windguard assembly, a second position, the second position being associated with a reversal of the normal flow direction of the crop material.

An advantage of the present invention is that it provides a windguard design of variable geometry for use with a harvester pickup to allow effective rejection of a crop plug from the machine.

Another advantage is that it provides that, in varying the geometry of the windguard, the windguard, or at least a portion thereof, can be extended forward to open up space for the crop plug to be removed.

Yet another advantage is that it provides that, in varying the geometry of the windguard, the tines of the windguard can be pivoted so that they do not act as barbs when the plug is attempted to be removed.

Yet another advantage is that the windguard assembly does not need to be removed in order to remove a crop plug.

Yet another advantage is that a variation of the geometry of the windguard assembly can be controlled by a controller, based upon sensor feedback, in order to optimize crop feeding. Alternatively, the variation of the geometry of the windguard assembly can be controlled by a user.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle, agricultural baler, and/or components thereof are usually determined with reference to the direction of forward operative travel of the agricultural vehicle and/or agricultural baler, but they should not be construed as limiting. The terms "longitudinal" and "transverse" are determined with reference to the fore-and-aft direction of the agricultural vehicle and/or agricultural baler and are equally not to be construed as limiting. The terms "downstream" and "upstream" are determined with reference to the intended direction of crop material flow during operation, with "downstream" being analogous to "rearward" and "upstream" being analogous to "forward."

Figure 1:
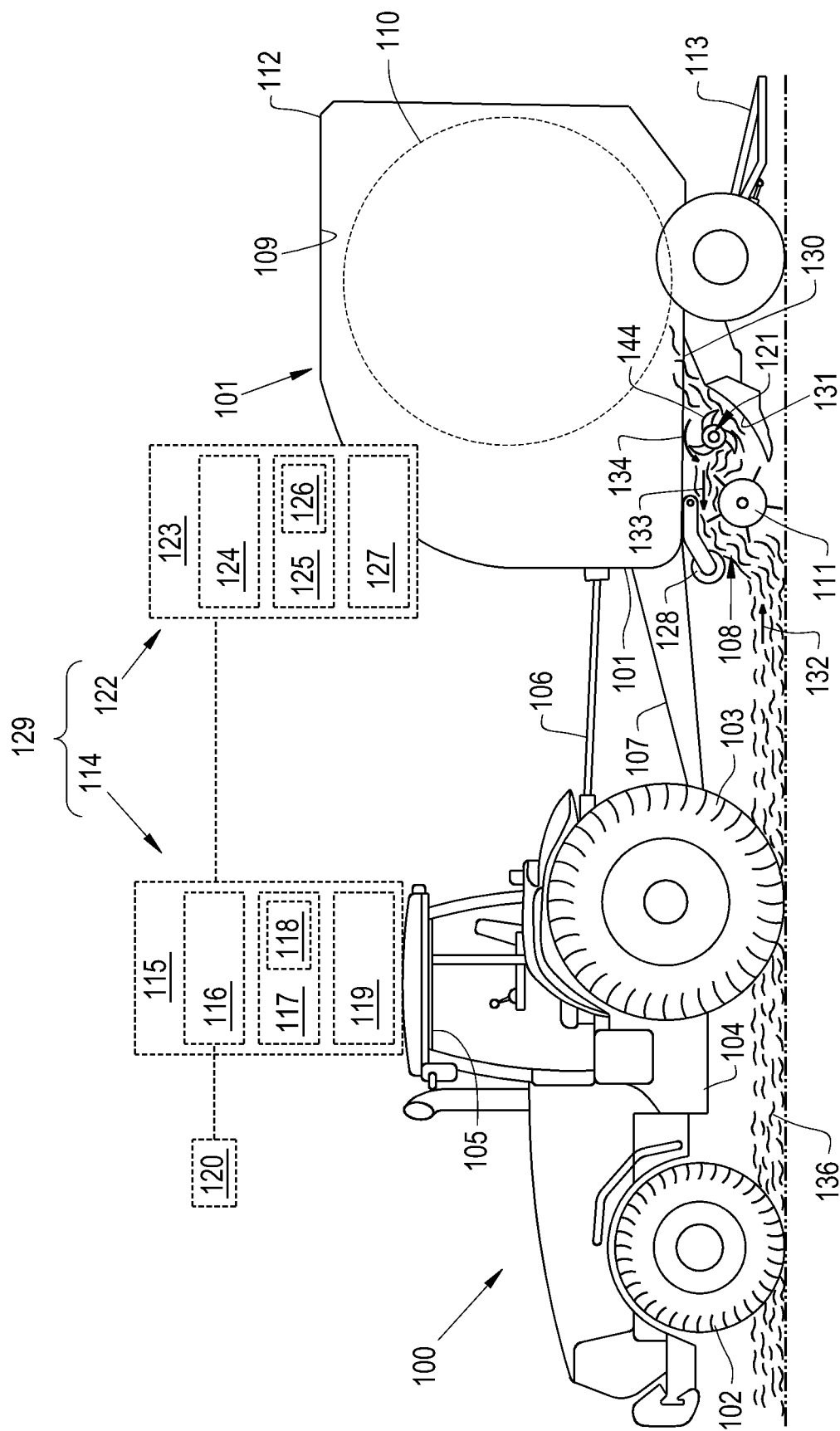
FIG. 1 illustrates a schematic side view of an exemplary embodiment of an agricultural vehicle, formed as a tractor, and an agricultural baler, the agricultural baler including a feeder system including a windguard assembly, in accordance with an exemplary embodiment of the present invention.

Referring now to the drawings, and more particularly to FIG. 1, there is shown an embodiment of an agricultural vehicle 100 (which can be referred to as a work vehicle 100) towing an agricultural baler 101 (any baler herein can be referred to as an agricultural machine), in accordance with the present invention, to perform a baling operation within a field (FIG. 1 is generic to all embodiments of the present invention discussed herein). As shown, work vehicle 100 can be configured as an agricultural tractor, such as an operator-driven tractor or an autonomous tractor. However, in some embodiments, the work vehicle 100 may correspond to any other suitable vehicle configured to tow a baler across a field or that is otherwise configured to facilitate the performance of a baling operation, including an autonomous baling vehicle. Additionally, as shown, baler 101 can be configured as a round baler configured to generate round bales. However, in some embodiments, baler 101 may have any other suitable configuration, including being configured to generate square or rectangular bales. It should be further appreciated that baler 101, while shown as being towed by tractor 100, may also be a self-propelled baler that does not rely on a separate vehicle for propulsion and/or power to function. While the present invention is described with respect to a baler, it can be appreciated that other the present invention can be used in conjunction with other agricultural machines, such as vehicles and/or implements, such as a self-loading forage wagon.

Work vehicle 100 includes a pair of front wheels 102, a pair of rear wheels 103, and a chassis 104 coupled to and supported by the wheels 102, 103. An operator's cab 105 may be supported by a portion of the chassis 104 and may house various input devices for permitting an operator to control the operation of work vehicle 100 and/or baler 101. Additionally, work vehicle 100 may include an engine and a transmission mounted on chassis 104. The transmission may be operably coupled to the engine and may provide variably adjusted gear ratios for transferring engine power to wheels 103 via a drive axle assembly.

As shown in FIG. 1, work vehicle 100 may be coupled to baler 101 via a power take-off (PTO) 106 and a tongue 107 to a hitch of work vehicle 100 to allow vehicle 100 to tow baler 101 across the field. As such, work vehicle 100 may, for example, guide baler 101 toward crop material 136 deposited in windrows on the field. As is generally understood, to collect the crop material 136, baler 101 includes a feeder system 108 (which can be referred to generally as a crop collector) mounted on a front end of baler 101. Feeder system 108 may, for example, include a pickup assembly 111, a rotary feeder assembly 121, a floor 131, and a windguard assembly 128. Pickup assembly 111 includes a rotating wheel with tines that collect crop material 136 from the ground and direct crop material 136 toward a bale chamber 109 of baler 101 in an overshot manner (rotating clockwise in FIG. 1). Rotary feeder assembly 121 includes a rotating shaft (rotor shaft) and a plurality of rotor devices 144 (which can be referred to as rotors 144) mounted to the shaft so as to rotate about the shaft in a counter-clockwise manner (as seen in FIG. 1 and shown by arrow 134), rotors 144 configured to push or otherwise to move crop material 136 towards or into bale chamber 109, in an undershot manner. Feeder system 108 can also include a rotating shaft (not shown in FIG. 1) generally between pickup assembly 111 and rotary feeder assembly 121 that includes side augers for moving crop material 136 inwardly prior to entering bale chamber 109. FIG. 1 shows crop material 136 lying in a windrow on the ground of the field and being picked up by pickup assembly 111 of feeder system 108. Upon being picked up, crop material flow 136 flows over pickup assembly 111, under windguard assembly 128, and under rotary feeder assembly 121, as indicated by arrow 132. Arrow 132 thus indicates the normal flow direction 132 of crop material 136 relative to feeder system 108. Conversely, arrow 133 shows a flow direction which is opposite the normal flow direction of crop material 136; this opposite flow direction 133 can also be referred to as a reverse flow direction 133 (that is, a reversal of normal flow direction 132). FIG. 1 shows baler 101 schematically and thus with one pair of wheels, though it can be appreciated that baler 101 can include one or more additional pair of wheels, as in FIG. 2.

Inside bale chamber 109, rollers, belts, and/or other devices compact the crop material 136 to form a generally cylindrically-shaped bale 110. Bale 110 is contained within baler 101 until ejection of bale 110 is instructed (e.g., by the operator and/or a baler controller 123 of baler 101). In some embodiments, bale 110 may be automatically ejected from baler 101 once bale 110 is formed, by baler controller 123 detecting that bale 110 is fully formed and outputting an appropriate ejection signal. Further, work vehicle 100 includes a control system 114, which includes a controller 115, which includes a processor 116, memory 117, data 118, and instructions 119. Control system 114 can further include an input/output device 120 such as a laptop computer (with keyboard and display) or a touchpad (including keypad functionality and a display), device 120 being configured for a user to interface therewith.

As shown in FIG. 1, baler 101 may also include a tailgate 112 movable between a closed position (as shown in the illustrated embodiment) and an opened position via a suitable actuator assembly. Tailgate 112 and/or the actuator assembly may be controlled to open and close by baler controller 123. In the closed position, tailgate 112 may confine or retain bale 110 within baler 101. In the open position, tailgate 112 may rotate out of the way to allow bale 110 to be ejected from the bale chamber 109. Additionally, as shown in FIG. 1, baler 101 may include a ramp 113 extending from its aft end that is configured to receive and direct bale 110 away from baler 113 as it is being ejected from bale chamber 109. In some embodiments, ramp 113 may be spring loaded, such that ramp 113 is urged into a raised position, as illustrated. In such embodiments, the weight of bale 110 on ramp 113 may drive ramp 113 to a lowered position in which ramp 113 directs bale 110 to the soil surface. Once bale 110 is ejected, bale 110 may roll down ramp 113 and be deposited onto the field. As such, ramp 113 may enable bale 110 to maintain its shape and desired density by gently guiding bale 110 onto the field. Further, baler 101 includes a control system 122, which includes controller 123, which includes a processor 124, memory 125, data 126, and instructions 127. Controller 123 can communicate with controller 115, so that controller 115 outputs information to the display of input/output device 120 of work vehicle 100, thereby informing a user of various conditions of baler 101 and bales 110 forming or formed therein. Further, baler 101 includes a frame 130 (which can be referred to as baler frame 130, or more generally as a machine frame 130) to which all of the components of baler 101 are directly or indirectly coupled. Thus, feeder system 108 and thus also pickup assembly 111, rotary feeder assembly 121, and windguard assembly 128 are coupled with frame 130.

It should be appreciated that the configuration of work vehicle 100 described above and shown in FIG. 1 is provided only as one example. Thus, it should be appreciated that the present disclosure may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer work vehicle, or rely on tracks in lieu of wheels 102, 103. Additionally, as indicated previously, work vehicle 100 may, in some embodiments, be configured as an autonomous vehicle. In such embodiments, work vehicle 100 may include suitable components for providing autonomous vehicle operation and, depending on the vehicle configuration, need not include the operator's cab 105.

Additionally, it should be appreciated that the configuration of baler 101 described above and shown in FIG. 1 is provided only as one example. Thus, it should be appreciated that the present disclosure may be readily adaptable to any manner of baler configuration, or other agricultural machines, such as a vehicle and/or implement, such as a self-loading forage wagon. For example, as indicated previously, baler 101 may, in some embodiments, correspond to a square baler configured to generate square or rectangular bales. It should be further appreciated that the illustration of baler 101 in FIG. 1 is schematic.

Further, in general, controllers 115, 123 may each correspond to any suitable processor-based device(s), such as a computing device or any combination of computing devices. Each controller 115, 123 may generally include one or more processor(s) 116, 124 and associated memory 117, 125 configured to perform a variety of computer-implemented functions (e.g., performing the methods, steps, algorithms, calculations and the like disclosed herein). Thus, each controller 115, 123 may include a respective processor 116, 124 therein, as well as associated memory 117, 125, data 118, 126, and instructions 119, 127, each forming at least part of the respective controller 115, 123. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the respective memory 117, 125 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory 117, 125 may generally be configured to store information accessible to the processor(s) 116, 124, including data 118, 126 that can be retrieved, manipulated, created, and/or stored by the processor(s) 116, 124 and the instructions 119, 127 that can be executed by the processor(s) 116, 124. In some embodiments, data 118, 126 may be stored in one or more databases.

Baler controller 123, herein, is assumed to be the primary controller for controlling operations of baler 101. However, controller 123 of baler 101, as indicated in FIG. 1, can be in communication with controller 115 of work vehicle 100, thereby forming a unified control system 129, such that any or all information associated with either controller 115, 123 can be shared with the other controller 115, 123, and either controller 115, 123 can perform the functions of the other controller 115, 123. Controllers 115, 123 can communicate with each other in any suitable manner, such as a wired connection or a wireless connection, such as radio signals (RF), light signals, cellular, WiFi, Bluetooth, Internet, via cloud-based devices such as servers, and/or the like. Further, while not shown, both controllers 115, 123 can communicate with a remotely located data center (which can also be a part of unified control system 129), which controllers 115, 123 can communicate with by any suitable way, such as those just referenced. Such a data center can include its own controller (and thus processor(s), memory, data, and instructions, substantially similar to that described above with respect to controllers 115, 123) which can be configured to perform any of the functions associated with controllers 115, 123. Controllers 115, 123 and the data center can be a part of any network facilitating such communication therebetween, such as a local area network, a metropolitan area network, a wide area network, a neural network, whether wired or wireless.

Figure 2:
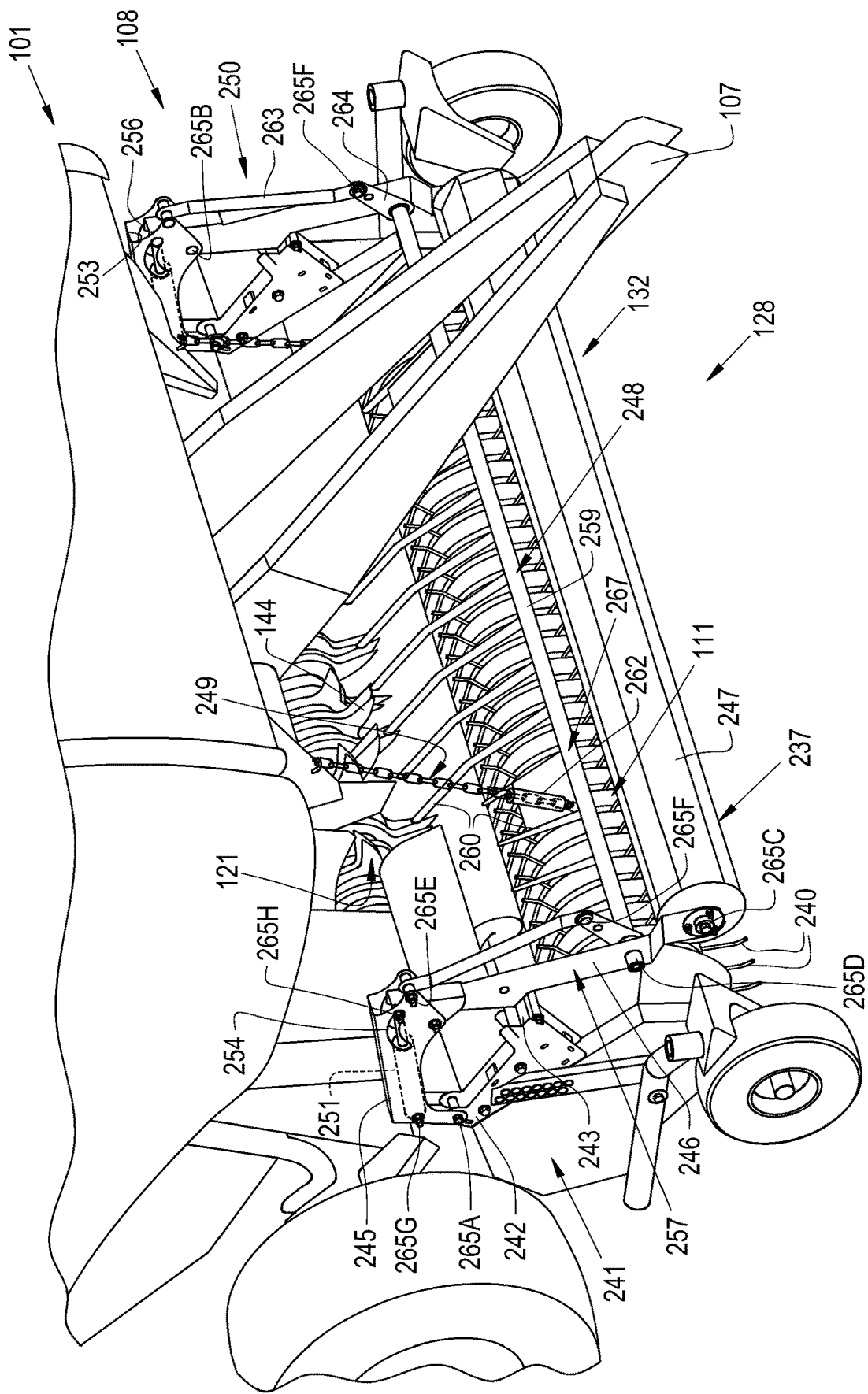
FIG. 2 illustrates a perspective view of the feeder system of the agricultural baler of FIG. 1 (at least partially schematically), the feeder system including the windguard assembly in a first position, with portions broken away, in accordance with an exemplary embodiment of the present invention.

Referring now to FIG. 2, there is shown feeder system 108 of baler 101, feeder system 108 (shown in part schematically) including pickup assembly 111, rotary feeder assembly 121, and windguard assembly 128. Pickup assembly 111 includes a plurality of pickup tines 240 which are configured to pick up the windrow of crop material 136 from the ground as tines 240 rotate in a counter-clockwise direction (as viewed from the bottom left of the page of FIG. 2), with crop 136 moving in a normal flow direction 132 once picked up by tines 240. Pickup assembly 111 further includes a frame 241 (which can be referred to as a pickup frame 241) including a windguard mounting device 242 on each lateral side of feeding system 108, which can be fastened to other portions of pickup frame 241, such as by way of rivets or threaded fasteners, such as bolts or screws, or the like. Windguard mounting device 242 further includes a stop mechanism 243 configured to selectively receive thereon a portion of windguard assembly 128; windguard mounting device 242 can be attached to pickup frame 241 in any suitable manner, such as by way of welding or by way of fasteners. Windguard frame 241 and windguard mounting device 242 can each be made of any suitable material, such as steel or a polymer. Rotary feeder assembly 121 includes rotors 144, each of which includes a plurality of generally triangular shaped tines, the rotors 144 being configured to move crop material 136 towards bale chamber 109 as rotors 144 rotate in a clockwise direction (as viewed from the bottom left of the page of FIG. 2).

Windguard assembly 128 is coupled with pickup assembly 111 and, according to an exemplary embodiment of the present invention, includes a first arm 245 (on each lateral side of feeding system 108), a second arm 246 (on each lateral side of feeding system 108), a roller 247, a tine mechanism 248, a chain assembly 249, a linkage assembly 250 (on each lateral side of feeding system 108), and an actuator 251 (on each lateral side of feeding system 108 as shown in FIG. 2, though optionally only one such actuator 251 may be included). Windguard assembly 128 can be substantially similar on both lateral sides of a midline running longitudinally, such that a description of one lateral side of windguard assembly 128 substantially serves as a description of the opposing lateral side of windguard assembly 128. Windguard assembly 128 is configured for selectively occupying a first position 237 and a second position 438, the first position 237 being associated with normal flow direction 132 of a crop material 136 relative to the feeder system 108, the second position 438 being associated with a reversal of the normal flow direction 132 of the crop material 136 (and thus a reversed flow direction 133). In general, the first position 237 is when windguard assembly 128 occupies, at least in part, a rearward position (as in FIG. 2), and the second position 438 is when windguard assembly 128 occupies, at least in part, a forward position (as in FIG. 4).

First arm 245 (which can be referred to as a fore member or forearm) is pivotably coupled at connection 265A with windguard mounting device 242 of pickup assembly 111 at a proximal end 352 of first arm 245 (stated another way, first arm 245 is supported by a pivot mount on windguard mounting device 242 of pickup assembly 111). In FIG. 2, first arm 245 is shown in an intermediate position when second arm 246 is retracted and resting on stop mechanism 243. Connection 265A can be made by any suitable connectors and/or fasteners, such as rivets, pins, screws, nuts, washers, bearings, and/or bolts. Further, first arm 245 can define a first arm channel 253 as shown in FIG. 2, which can be substantially U-shaped. Side walls of first arm channel 253 can each define a slot 254, which can be arcuate, for slidably receiving therein sliding structure, such as a pin or shaft of a connector or fastener, which can be part of connection 265H (below). First arm 245 can be made of any suitable material, such as steel, a polymer, or carbon fiber, and can be made in any suitable manner, such as stamping, metal forming, welding, and/or injection molding.

Second arm 246 (which can be referred to as a rear member or rear member) is pivotably coupled with first arm 245 at connection 265B (at a distal end 355 of first arm 245 and a proximal end of second arm 246) and can define, at least in part, a second arm channel 256. Second arm 246 is also pivotably coupled with opposing ends of windguard roller 247 at connection 265C (at a distal end of second arm 246). Connections 265B and 265C can be made by any suitable connectors and/or fasteners, such as rivets, pins, screws, nuts, washers, bearings, and/or bolts. Second arm 246 can be made of any suitable material, such as steel, a polymer, or carbon fiber, and can be made in any suitable manner, such as stamping, metal forming, welding, and/or injection molding. Roller 247 extends between opposing second arms 246 across a front portion of windguard assembly 128 and can pivot in either direction, as is known, as crop material 136 contacts roller 247. Though the windguard assembly of the present invention is discussed as having a roller, it can be appreciated that the present invention is not limited to a type of windguard assembly having a roller (and thus includes windguard assemblies without a roller).

Tine mechanism 248 includes a bar 259 (which can also be referred to as a tube 259, or tine bar 259) and a plurality of tines 260 rigidly connected to bar 259, tines 260 projecting generally in an aft direction. Bar 259 is pivotably coupled with second arm 246 at connection 265D, such that bar can extend through each second arm 246 (this is different than a known prior art device, wherein a tine bar is welded to an arm). Connection 265D can be made by any suitable connectors and/or fasteners, such as rivets, pins, screws, nuts, washers, bearings, and/or bolts. Tines 260 are configured for riding on a top portion of crop material 136 as crop material flows through feeder system 108 and thereby serves, at least in part, to retain crop material 136 within feeder system 108 and on a proper path to bale chamber 109. Tine mechanism 248 can be made of any suitable material, such as steel, a polymer, or carbon fiber, and can be made in any suitable manner, such as stamping, metal forming, welding, and/or injection molding.

Chain assembly 249 can include one or more chains 261 (such as two, as shown in FIG. 2). Each chain 261 can extend between tine mechanism 248 and a front portion of baler 101 on baler frame 130 so as to be pivotal therewith (by way of a hook(s), for example) and thereby hold and thus support portions of windguard assembly 128 when not otherwise supported, for example, by actuator 251 and/or crop material 136. More specifically, first and second arms 245, 246 can receive support by way stop mechanism 243 (i.e., FIGS. 2, 4, 6), crop material 136 (i.e., flowing normally through feeder system 108, as a plug, or as a plug being backed out of feeder system 108), or chain 261. With respect to chain 261, chain 261 can suspend at least portions of windguard assembly 128 when windguard assembly 128 is not otherwise supported by stop mechanism 243 or crop material 136; when chain 261 supports portions of windguard assembly 128 chain 261 can be taut, and when it does not chain 261 can be slack. Chain assembly 249 can also include a chain sleeve 262 surrounding at least a portion of each chain 261, chain sleeve 262, at least in part, keeping chain 261 substantially straight in the vicinity of the connection between chain 261 and tine mechanism 248 and can help chain 261 from interfering with other nearby structure. Chain sleeve 262 can be a relatively rigid material, such as a plastic pipe, and or made of flexible material.

Linkage assembly 250 includes a first linkage 263 and a second linkage 264 pivotably coupled with first linkage 263. First linkage 263 (which can be referred to as a push rod 263) can be pivotably coupled with first arm 245 at connection 265E (at a proximal end of first linkage 263), which can be made by any suitable connectors and/or fasteners, such as rivets, pins, screws, nuts, washers, bearings, and/or bolts. First and second linkages 263, 264 can be pivotably coupled together at connection 265F (at a distal end of first linkage 263), which can be made by any suitable connectors and/or fasteners, such as rivets, pins, screws, nuts, washers, bearings, and/or bolts. Second linkage 264 (which can be referred to as a crank arm 264) can also be rigidly connected to bar 259, in any suitable way, such as by welding. First and second linkages 263, 264 can be made of any suitable material, such as steel, a polymer, or carbon fiber, and can be made in any suitable manner, such as stamping, metal forming, welding and/or injection molding. Further, linkage assembly 250 is configured for moving tine mechanism 248 between a down position 267 and an up position 468 when second arm 246 moves between a retracted position 257 and an extended position 458, respectively, FIG. 2 showing tine mechanism 248 in the down position 267 and second arm 246 in the retracted position 257. Thus, the present invention provides linkage assembly 250 which is configured for rotating and thereby for changing an angle of tines 260 dependent on pivot connection 265B.

Actuator 251, as shown in FIG. 2, is pivotably coupled with first arm 245 and second arm 246 at connections 265G and 265H, respectively, each of which can be made by any suitable connectors and/or fasteners, such as rivets, pins, screws, nuts, washers, bearings, and/or bolts. Actuator 251 can be of any suitable configuration or type. For instance, actuator 251 can be a linear actuator or a rotary actuator. As a linear actuator, actuator can be a hydraulic cylinder assembly, a pneumatic cylinder assembly, or an electrically actuated cylinder assembly (which can include gearing and/or screws, for example). Herein, by way of example and not limitation, actuator 251 is shown and described as a linear actuator 251, more specifically, a hydraulic cylinder assembly 251, including a cylinder (which can also be referred to as a barrel), a piston within the cylinder, and a rod coupled with the piston. As one example, the cylinder can receive (in a portion of the cylinder) a hydraulic fluid (such as hydraulic oil), so as to cause the piston to be displaced within the cylinder and thereby to move the rod, causing the rod to extend; conversely, the hydraulic fluid can be caused to exit from a portion of the cylinder, so as to cause the piston to be displaced in an opposite direction within the cylinder and thereby to move the rod, causing the rod to retract. FIG. 2 shows the cylinder of actuator 251 including ports through which hydraulic fluid can enter and exit the cylinder, though additional structure of a hydraulic system (of which actuator 251 is a part) is not shown. Such a hydraulic system can include valving (for metering the proper amount of hydraulic fluid entering and exiting the cylinder), hydraulic lines, a reservoir of hydraulic fluid, and a pump, though other structures can be included or substituted therefor; structure of the hydraulic system can be maintained on baler 101 and/or work vehicle 100. Connection 265G is made with the cylinder of cylinder assembly 261, and connection 265H is made with the rod of cylinder assembly 251. Actuator 251, as shown in FIG. 2, can be positioned, at least in part, within first arm channel 253 and second arm channel 256. As indicated above, first arm channel 253 includes side walls each defining an arcuate slot 254, and the pin or shaft of the connector or fastener of connection 265H connects the rod of cylinder assembly 251 not only with second arm 246 (pivotably) but also with first arm 245 by way of the opposing slots 254, such that the rod of cylinder assembly 251 is slidably coupled with first arm 245 by way of slots 254. Actuator 251 is configured for moving second arm 246 between the retracted position 257 of second arm 246 and the extended position 458 of second arm 246, the retracted position 257 being associated with the first position 237 of windguard assembly 128, the extended position 458 being associated with the second position 438 of windguard assembly 128. FIG. 2 shows windguard assembly 128 in the first position 237, the rod of actuator 251 being extended to its farthest extent (such that the pin or shaft of connection 265H is seated at a distal end of slot 254), second arm 246 being in the retracted position 257, and tines 260 being in their down position 267. Thus, when actuator 251 is activated (i.e., by user, and/or by controller(s) 115, 123), second arm 246 is rotated relative to first arm 245 about an axis of rotation at connection 265B. More specifically, when windguard assembly is positioned as shown in FIG. 2, retraction of the rod of actuator 251 causes second arm 246 to pivot counter-clockwise (viewed from the bottom left of the page of FIG. 2) about an axis of rotation at connection 265B, causing extension forward of second arm 246. This rotation of second arm 246 causes rotation of first linkage 263 at connection 265E, first linkage 263 then pushing second linkage 264 such that first and second linkages 263, 264 rotate at about an axis at pivot connection 265F and second linkage rotates clockwise about an axis at connection 265D, which causes tine bar 259 and tines 260 to rotate together clockwise to the up position 468, thereby creating space for a plug of crop material 136 to be removed.

Figure 3:
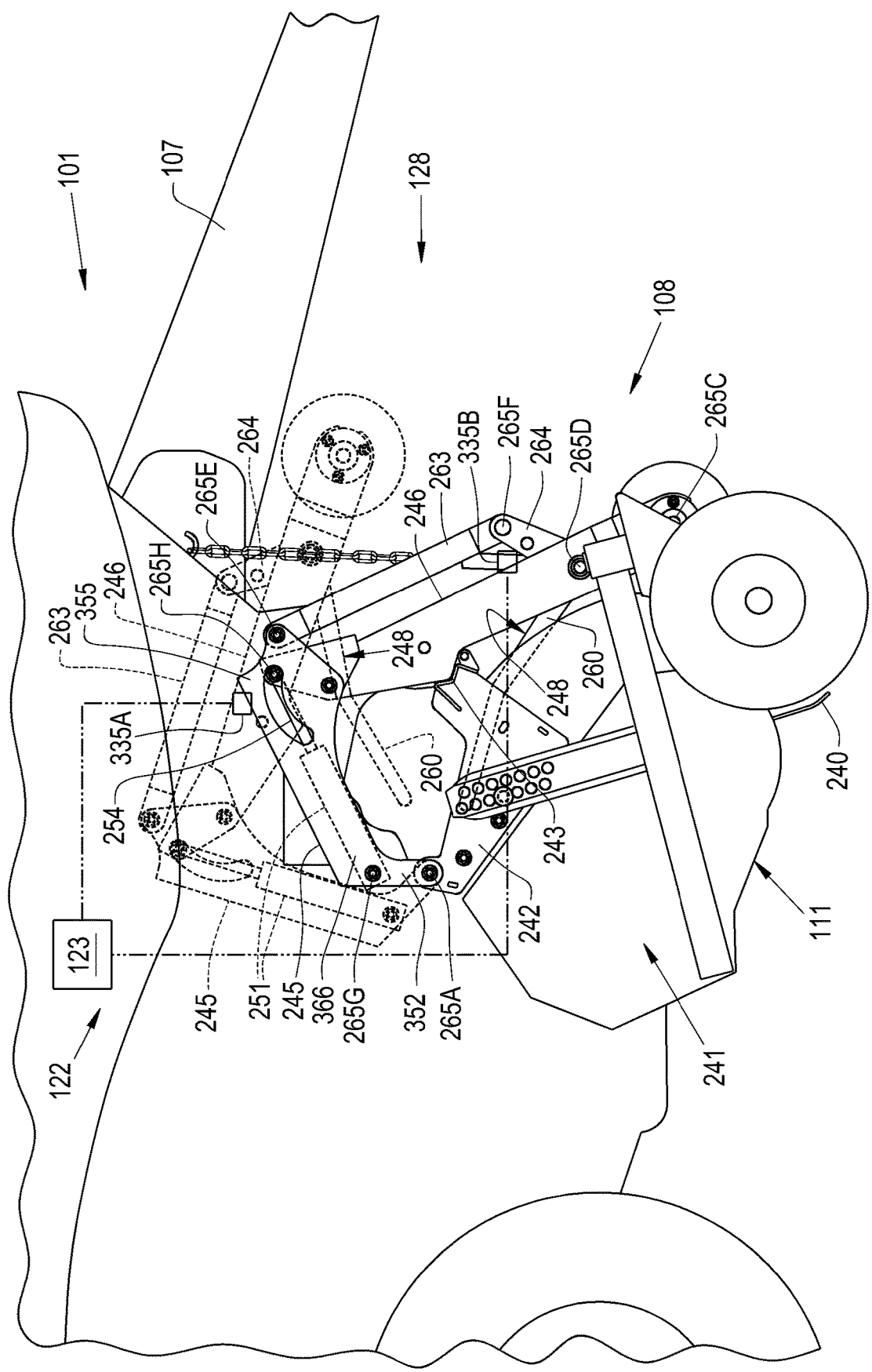
FIG. 3 illustrates a side view of the feeder system of FIG. 2 (at least partially schematically), the windguard assembly being in the first position, with portions broken away.

Referring now to FIG. 3, there is shown a side view of feeder system 108 (partially schematically). Feeder system 108 is shown to include pickup assembly 111, pickup tines 240, pickup frame 241, windguard mounting device 242, and windguard assembly 128. Windguard assembly 128 is shown in two orientations, with first arm 245 at an intermediate position (in solid lines, and substantially similar to the orientation of windguard assembly 128 in FIG. 2), and with first arm 245 rotated up (counter-clockwise on the page of FIG. 3) (in broken lines). Both orientations of windguard assembly 128 shown in FIG. 3 show windguard assembly 128 in normal operation and thus in the first position 237, considering that second arm 246 has not been extended forward by actuator 251 (second arm 246 is fully retracted, in retraction position 257) and thus also tine mechanism 248 remains in its down position 267; being in the first position 237, windguard assembly 128 (in either orientation in FIG. 5) is not yet positioned for a plug of crop material 136 to be cleared. With regard to the orientation of windguard assembly 128 shown in FIG. 3 with first arm 245 in the intermediate position (windguard assembly 128 in solid lines), second arm 246 is retracted and resting on stop mechanism 243. Because second arm 246 is on stop mechanism 243, chain 261 can be slack (alternatively, when second arm 246 is not resting on stop mechanism 243, chain 261 can be taut, such that windguard assembly 128 can be, at least in part, suspended by chain 261, if windguard assembly 128 is not otherwise supported by or resting on crop material 136 instead). First arm 245 includes proximal end 352 and distal end 355. Actuator 251 includes a proximal end 366 which is pivotably coupled with proximal end 352 of first arm 245 (alternatively, actuator 251 could be reversed, with its proximal end 352 being pivotably coupled with second arm 246, rather than proximal end 352 of first arm 245). With second arm 246 being fully retracted, tine mechanism 248 is in its down position 267, with tines 260 being down. FIG. 3 thus depicts a normal operating position of windguard assembly 128, with windguard assembly 128 at resting height dictated by stop mechanism 243 (or, if not stop mechanism 243, then the length of chain 261). Further, each of connections 265A-H is a pivotal connection, such that rotation with respect to each connection 265A-G occurs about a respective axis of rotation that is perpendicular to the page of FIG. 3. This first orientation (in solid lines) of first arm 245 can occur when no or a relatively small quantity of crop material 136 is flowing through feeder system 108. The pivot of first arm 245 at connection 265A is generally free-floating, in the sense that first arm 245 can pivot at connection 265A about a rotational axis extending between connections 265A depending upon the quantity of crop material 136. A larger quantity of crop material 136 pushes first arm 245 up so as to rotate a greater degree counter-clockwise at connection 265A, and, conversely, a lesser quantity of crop material 136 enables first arm 245 to rotate a greater degree clockwise at connection 265A (so long as this rotation clockwise is not blocked by stopping mechanism 243 of the length of chain 261). In this way, windguard assembly 128 can be said to swing or be suspended by chain 261. With regard to the orientation of windguard assembly 128 shown in FIG. 3 with first arm 245 rotated up (windguard assembly 128 in broken lines), this position of first arm 245 can occur when a relatively large quantity of crop material 136 is flowing through feeder system 108 (and thus tines 260 generally ride on a top portion of the mat of crop material 136), or a plug of crop material 136 has plugged or become jammed in feeder system 108. In this latter orientation (first arm 245 rotated up), first arm 245 can be at maximum rotation counter-clockwise, such that windguard assembly 128 is at maximum height (being supported by the crop material in this orientation, chain 261 can be slack). Thus, first arm 245 can freely pivot at connection 265A, depending upon the amount of crop material 136 in feeder system 108 (whether crop material 136 is not plugged, or is plugged, in feeder system 108).

With further reference to FIG. 3, control system 122 is shown according to one embodiment of the present invention, that is, to include position sensors 335A, 335B relative to windguard assembly 128 (alternatively, the present invention is not required to be used in conjunction with sensors, such as position sensors 335A, 335B, but the present invention can function by user controlling, for example, hydraulic remotes/valves manually with sensors being absent). Thus, control system 122 can further include not only controller 123 but also sensor 335A and/or sensor 335B (additional sensors can be employed, such as additional position sensors for sensing a position of windguard assembly 128), each of which can be position sensors (for illustrative purposes controller 123 and sensors 335A, 335B are shown only in FIG. 3, but they can be impliedly present in other figures as well). Sensors 335A, 335B, each of which are schematically shown and positioned, are operatively coupled with controller 123 (and also controller 115) and are each configured to help determine whether windguard assembly 128 is in the first position 237 or the second position 438. Sensor 335A can be positioned to sense a position of the rod of actuator 251, a position of second arm 246 relative to first arm 245, and/or a position of first linkage 263 relative to first arm 245 (alternatively, sensor 335A, or another position sensor, could be placed inside the cylinder of actuator 251 to sense a position of the piston within the cylinder). The position of the rod of actuator 251 corresponds with the position of second arm 246, indicating whether second arm 246 is fully retracted, fully extended (and thus forward), or at an intermediate position therebetween. Further, in sensing the position of the rod, this sensing can be done by sensing a position of the pin or shaft of connection 265H within slot 254. In sensing the position of second arm 246 relative to first arm 245, sensor 335A can sense a linear and/or angular position of second arm 246 relative to first arm 245. In sensing the position of first linkage 263 relative to first arm 245, sensor 335A can sense, for example, an angular position of first linkage 263 relative to first arm 245. Sensor 335B can be positioned to sense a position of second linkage 264 relative to first linkage 263, a position of second linkage 264 and/or bar 259 relative to second arm 246, and/or a position of tines 260 relative to second arm 246. In sensing the position of second linkage 264 relative to first linkage 263, sensor 335B can be positioned on or near first or second linkage 263, 264 and can be configured to sense an angular position of second linkage 264 relative to first linkage 263. In sensing the position of second linkage 264 and/or bar 259 relative to second arm 246, sensor 335B can sense an angular position of second linkage 264 and/or bar 259 relative to second arm 246. In sensing the position of tines 260 relative to second arm 246, sensor 335B can sense a linear or angular position of tines 260 relative to second arm 246. Upon sensing any of these respective positions, sensor(s) 335A, 335B can output a respective position signal to controller 123. Controller 123 is configured for receiving the respective position signals from sensors 335A, 335B. Upon receiving these respective position signals, controller 123 can output position information to controller 115 based at least in part on these position signals, which can output this information to user by way of input/output device 120. User (i.e., operator of tractor 100) can enter a command in cab 105 via input/output device 120, and controller(s) 115 and/or 123 can cause windguard assembly 128 to adjust its position, in accordance with the user's command. Adjustment of the positioning of windguard assembly 128 can occur while baler 101 is or is not traversing across the ground, depending upon the circumstances, though removal of a plug of crop material 136 can be typically performed when baler 101 is not traversing the ground. User's command can thus move windguard assembly into first position 237 and second position 438, depending upon the circumstances. Thus, the present invention provides for in-cab adjustment of windguard assembly 128 to remove a plug of crop material 136. Further, though normal use of windguard assembly 128 can be (as discussed herein) with second arm 246 fully retracted, a user may find it advantageous to run windguard assembly 128 with second arm 246 at least partially extended during normal operation of baler 101 (when baler 101 traverses the ground so as to pick up a windrow of crop material 136), depending, for instance, on crop types and conditions; such a configuration of windguard assembly 128 can be controlled by user from cab 105 by way of input/output device 120. Alternatively or in addition thereto, user may find it advantageous to adjust windguard assembly 128 with second arm 246 being at least partially extended, not necessarily while baler 101 is traversing the ground, but when baler 101 is stopped for other reasons than for clearing a crop plug, such as for maintenance of feeder system 108 or any other aspect of baler 101. That is, extending second arm 246 and thus also moving tine mechanism 248 upwardly can create additional space within feeder system 108 and thereby improve accessibility to feeder system 108, such as for maintenance of pickup assembly 111, rotary feeder assembly 121, windguard assembly 128, and/or for replacement of tines 240 or hoops (i.e., which tines 240 pass between).

Alternatively or in addition thereto, control system 129 can be configured to automatically unplug feeder system 108 of a plug of crop material 136, without the user having to enter a command to do so (this alternative can occur with a user operating tractor 100 pulling baler 101, or with autonomous tractor and/or baler operations). Though not shown, control system 122 of baler 101 can include at least one sensor configured for: (a) sensing a plug of crop material 136 in feeder system 108 (for example, optical sensors detecting a profile of crop material 136 indicative of a plug of crop material, and/or weight sensors detecting a weight of crop material 136 indicative of a plug of crop material 136, and/or any other sensor(s) suitable for detecting a plug of crop material 136); and (b) outputting a plug signal corresponding to the plug sensed by the sensor. Controller 123 (and/or controller 115) is configured for: (a) receiving this plug signal; (b) for outputting an adjustment signal, based at least in part on the plug signal, so as to adjust windguard assembly 128 so as to remove the plug of crop material 136 and thereby to move windguard assembly to second position 438; and (c) after removal of the plug, for outputting an additional adjustment signal, based at least in part upon another position signal indicative of windguard assembly 128 being in second position 438 and another signal indicative of the removal of the plug of crop material (i.e., another optical signal indicating a profile, or lack thereof, of crop material 136, or a weight or mass of crop material 136, indicating an absence of the plug), for moving windguard assembly 128 back to first position 237 for normal operation of baler 101.

Figure 4:
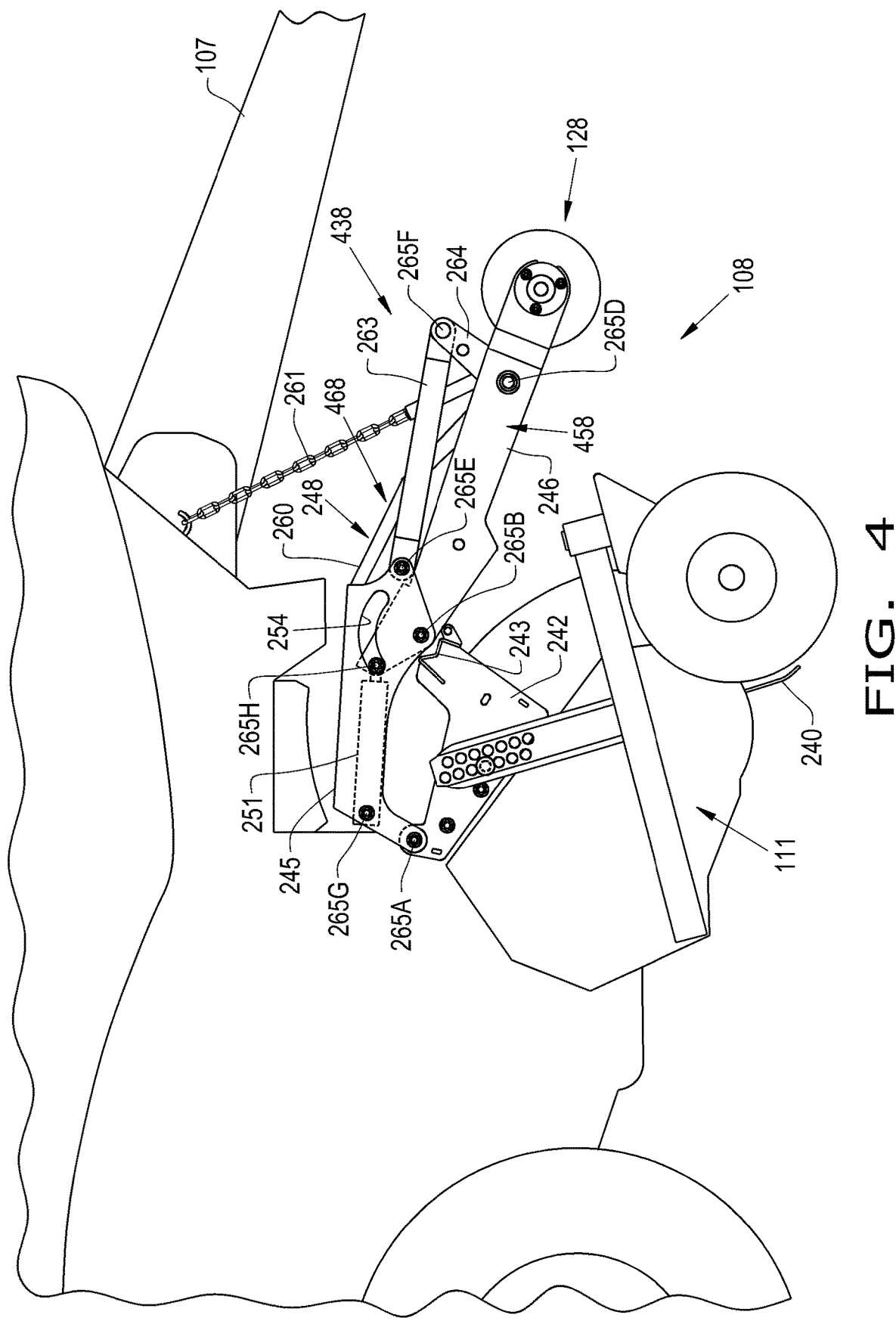
FIG. 4 illustrates a side view of the feeder system of FIG. 2 (at least partially schematically), the windguard assembly being in the second position, with portions broken away.

Referring now to FIG. 4, there is shown a side view of feeder system 108, partially schematically. Feeder system 108 is shown to include pickup assembly 111 with tines 240, and windguard assembly 128. The primary difference between FIGS. 3 and 4 is that windguard assembly 128 is in the second position 438 in FIG. 4, considering that second arm 246 has been extended forward by actuator 251 (second arm 246 is fully extended to extended position 458) and thus also tine mechanism 248 is now in its up position 468. Being in the second position 538, windguard assembly 128 is positioned for a plug of crop material 136 to be cleared and thus is not in normal operating position for normal operation of baler 101 (that is, when crop material 136 is flowing into bale chamber 109). Hydraulic cylinder assembly 251 has retracted its rod, pulling back the pin or shaft of connection 265H to a proximal end of slot 254, which has caused: (a) second arm 246 to pivot counter-clockwise (viewed from a bottom left of the page of FIG. 4) at connection 265B so that roller 247 extends farther forward; and (b) first linkage 263 has pivoted at connection 265E and has pushed second linkage 264 forward at connection 265F, which has caused second linkage 264 to pivot bar 259 at connection 265D, resulting in tines 260 moving from their down position 267 (which is their downmost position) to their up position 468 (which is their upmost position). The movement of second arm 246 and roller 247 forward creates space for a plug of crop material 136 to be backed out of and removed from feeder system 108, and the movement of tines 260 to their up position 468 pivots the tip of tines 260 far enough up so that when crop material 136 is backed out (such as by reversing the normal direction 134 of rotor 144) the tips of tines 260 do not stick into crop material 136 (as barbs) and thereby inhibit the removal of crop material 136 from feeder system 108. Further, relative to FIG. 3, first arm 245 has pivoted clockwise (and thus farther downward) at connection 265A. Thus, being in second position 438, the crop material 136 can be reversed (in direction 133, FIG. 1), which can occur, for example, when rotors 144 are reversed so as to remove a plug of crop material 136. Thus, second position 438 is associated with a reversed operation of rotors 144.

Further, though not shown in FIG. 4, first arm 245 can pivot at connection 265A, as shown to occur in FIG. 3. FIG. 4 shows first arm 245 in a downmost position, with first and/or second arm 245, 246 resting on stop mechanism 243; when arm(s) 245, 246 do not rest on stop mechanism 243, chain 261 can be taut, suspending at least portions of windguard assembly 128 (in this way, the height of windguard assembly 128 can depend upon the amount of crop material 136 (whether as a plug or not) in feeder system 108, the height of stop mechanism 243, or the length of chain 261). This orientation of first arm 245 (shown in FIG. 4) can occur when no or a relatively small quantity of crop material 136 is flowing through feeder system 108. However, first arm 245 can freely pivot at connection 265A, depending upon the amount of crop material 136 in feeder system 108. Thus, first arm 245 can pivot at connection 265A upward (counter-clockwise) due to an increased amount of crop material 136 in feeder system 108. Thus, tines 260 can generally ride on a top portion of a mat of crop material 136, or a plug of crop material 136 that has plugged or jammed in feeder system 108. For high volume plugs of crop material 136, windguard roller 247 may roll over the top of the plug during extension of second arm 246 by actuator 251, in which case support chains 261 can be slack.

In use, with respect to the embodiment of the present invention shown in FIGS. 2-6, windguard assembly 128 can be run in first position 237 during normal operation of baler 101. Upon a plug of crop material 136 forming in feeder system 108, user (i.e., in cab 105 of tractor 100) can enter a command via device 120 for windguard assembly 128 to move from first position 237 to second position 438 by way of control system 129. Upon doing so, rotors 144 can be reversed (either by the same command or by way of an additional command) so that crop material 136 is reversed (in direction 133) and thereby backed out of feeder system 108. After removing the plug of crop material 136 (either by the same command or by way of an additional command), windguard assembly 128 can be returned to first position 237, so that baling of crop material 136 can continue. Alternatively, this removal of crop material, and return to normal operation of baler 101, can be performed automatically by control system 129.

Figure 5:
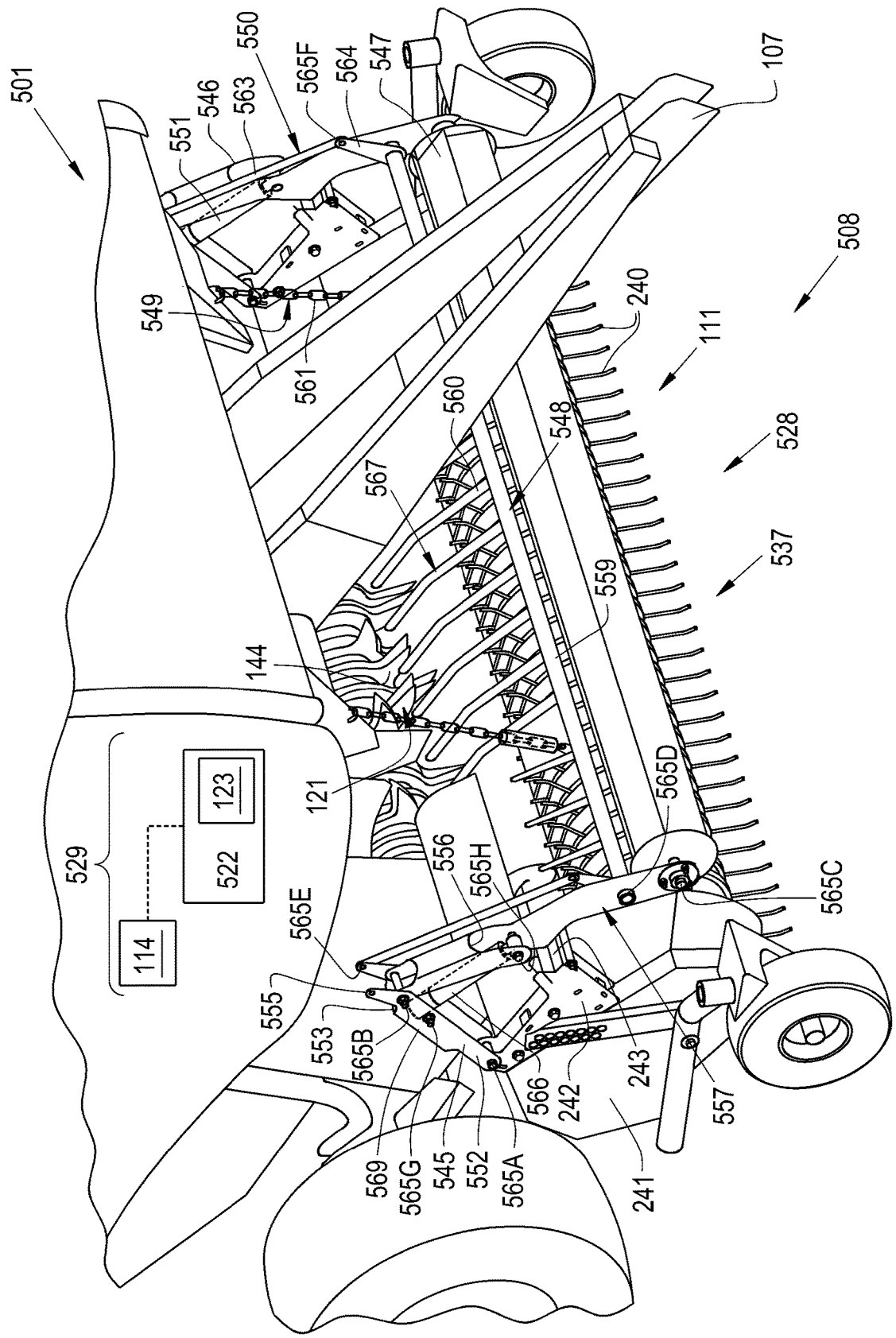
FIG. 5 illustrates a perspective view of another exemplary embodiment of the feeder system of the agricultural baler (at least partially schematically), the feeder system including the windguard assembly in the first position, with portions broken away, in accordance with an exemplary embodiment of the present invention.
Figure 6:
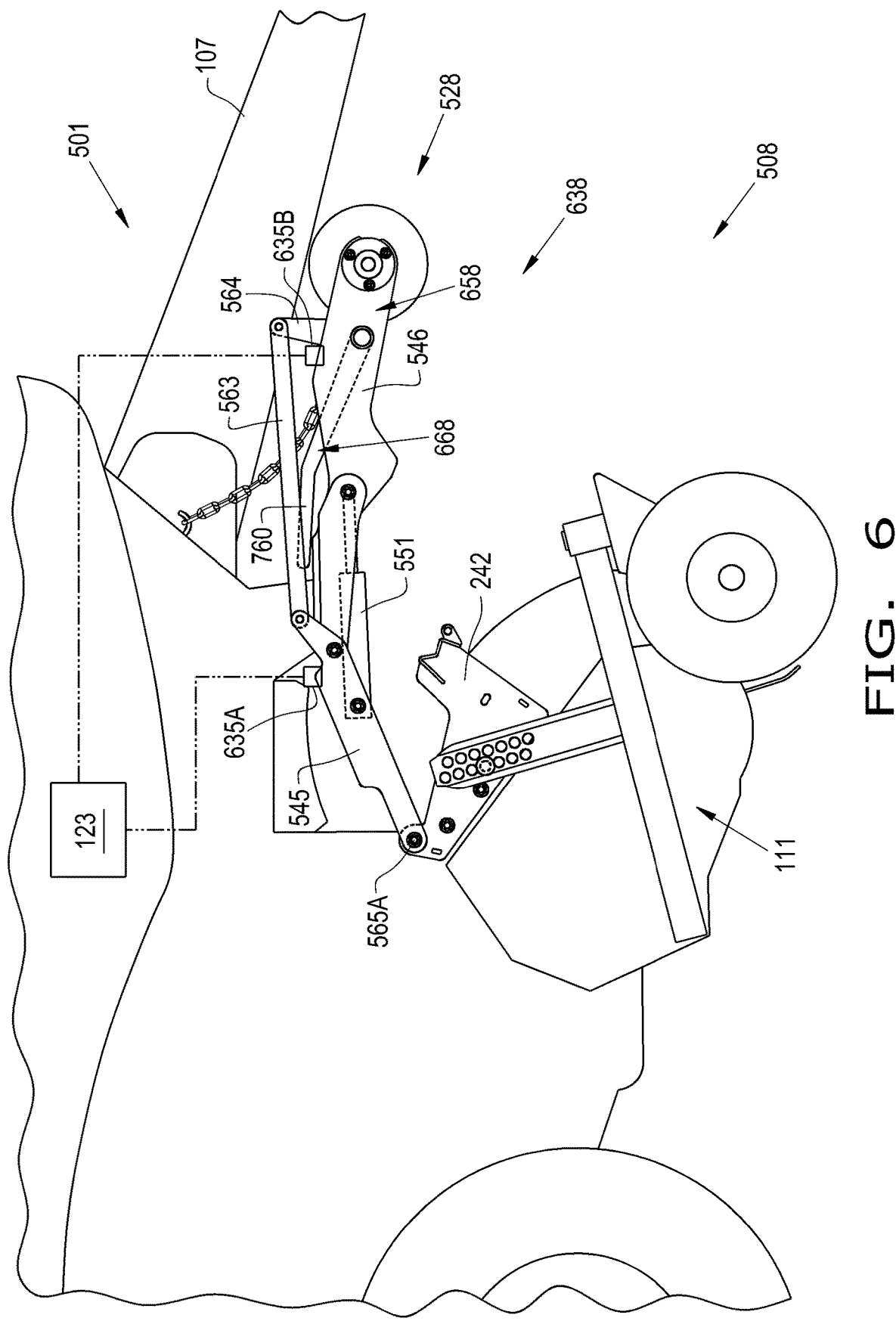
FIG. 6 illustrates a side view of the feeder system of FIG. 5 (at least partially schematically), the windguard assembly being in the second position, with portions broken away.

Referring now to FIGS. 5-6, there is shown a second embodiment of the present invention. All prior reference numbers remain the same or are increased by a multiple of 100 and are substantially similar to the structures and function of the embodiment shown in FIGS. 2-4, unless otherwise shown and/or described; thus, in an effort to avoid repetition, what is shown or described with respect to FIGS. 2-4 applies to FIGS. 5-6, unless otherwise shown or described differently with respect to FIGS. 5-6 (FIG. 1 is generic to both embodiments shown in FIGS. 2-6). The primary difference between the first embodiment and the second embodiment is the windguard assembly.

Referring now to FIG. 5, there is shown a perspective view of baler 501, with portions broken away. Baler 501, which can be pulled by tractor 100, includes baler control system 522, which includes controller 123 and sensor(s) 635A, 635B, and baler control system 522 is a part of unified control system 529, which also includes tractor control system 114. Further, baler 501 includes feeder system 508. Feeder system 508 includes pickup assembly 111, rotary feeder assembly 121, and windguard assembly 528, which is shown in first position 537. Pickup assembly 111 includes pickup tines 240, pickup frame 241, windguard mounting device 242, and stop mechanism 243, substantially as described above. Rotary feeder assembly 121 includes rotors 144, substantially as described above. Windguard assembly 528 includes first arm 545, second arm 546, roller 547, tine mechanism 548, chain assembly 549, linkage assembly 550, actuator 551, and connections 565A-H (each of which is a pivot connection). First arm 545 is pivotably coupled with windguard mounting device 242 at connection 565A and includes proximal end 552, distal end 555, central section 569, and first arm channel 553. Second arm 546 is pivotably coupled with first arm 545 at connection 565B, includes second arm channel 556, and is shown in FIG. 5 in retracted position 557, resting on stop mechanism 243 (if second arm 546 were not resting on stop mechanism 243, then second arm 546 can be supported and thus suspended by chain 561, or supported by crop material 136). Roller 547 is pivotably connected with second arm 546 at connection 565C. Tine mechanism 548 includes tine bar 559 and tines 560, and bar 559 is pivotably coupled with second arm 546 at connection 565D. With second arm 546 in retraction position 557 in FIG. 5, tine mechanism 548 is in down position 567. Chain assembly 549 includes a chain 561 and can include a chain sleeve (not shown in FIG. 5). Linkage assembly 550 includes first linkage 563 (pivotably connected to first arm 545 at connection 565E) and second linkage 564 pivotably coupled with first linkage at connection 565F. Second linkage 564 is rigidly connected with tine bar 559, such as by welding. Actuator 551 can be a hydraulic cylinder assembly with the cylinder, the piston, and the rod, though other types of actuators can be used (as described above). Actuator 551 includes a proximal end 566, which can include a proximal end of the cylinder (as shown in FIG. 5). Proximal end 566 is pivotably connected to first arm 545 at connection 565G; more specifically, proximal end 566 is pivotably coupled with central section 569 of first arm 545 at connection 565G. Further, a distal end of actuator 551 can be formed by the rod and is pivotably coupled with second arm 546 at connection 565H. Unlike the first embodiment, this connection 565H does not involve sliding a pin or shaft of connection 565H within a slot formed by first arm 545. When the rod of actuator 551 extends, second arm 546 extends forward, causing second arm 546 to rotate counter-clockwise (viewed from the bottom left in the page of FIG. 5) about connection 565B; conversely, when the rod of actuator 551 retracts, second arm 546 retracts backward, causing second arm 546 to rotate clockwise about connection 565B. Further, as with the first embodiment, windguard assembly 528 can pivot about connection 565A depending upon the quantity of crop material 136.

Referring now to FIG. 6, there is shown baler 501 with feeder system 508, with windguard assembly 528 being in second position 638. As such, second arm 546 is in extended position 658, and tine mechanism 548 is in up position 668. In second position 638, windguard assembly 528 is configured for clearing of a crop plug. Rather than resting on stop mechanism 243, second arm 546 can be suspended by a taut chain 561 (or, alternatively, be supported by crop material 136, either as a plug or not). In FIG. 6, first arm 545 has rotated clockwise about connection 565A (relative to FIG. 5). Further, as with the first embodiment, the extension of second arm 546 has caused first linkage 563 to push on second linkage 564, which has caused tine bar 559, and thus tines 560, to rotate upward (clockwise). As in the first embodiment of the present invention, first arm 545 can rotate at pivot connection 565A depending upon the quantity of crop material 136. FIG. 6 shows windguard assembly 528 with first arm 545 pivoted up. This can occur when windguard assembly encounters a relatively large volume of crop material 136, which can cause first arm 545 to pivot about an axis of rotation (perpendicular to the page of FIG. 6) associated with connection 565A. Thus, though not shown in FIG. 6, first arm 545 can be pivoted downwards (clockwise) when encountering less crop material, and can be stopped by stop mechanism 243 and/or chain 561. In use, feeder system 508 can be used substantially similarly to what is described with respect to feeder system 108. Further, sensors 635A, 635B are substantially similar to sensors 335A, 335B and thus are also position sensors that send their data to controller 123 (and/or controller 115), except that sensor 635A does not sense positional information relative to a slot similar to slot 254. Further, position sensors 635A, 635B are optional, such that the present invention can be used without them. That is, as with the first embodiment, a user can still enter a command (such as by way of device 120) to clear a crop plug, even without information from sensors 635A, 635B.

Further, yet another embodiment of the present invention is provided. That is, the windguard assembly of the present invention can be mounted to baler tongue 107. Thus, any of the embodiments of the windguard assembly according to the present invention can be adapted so as to mount to tongue 107. Further, in accordance with yet another embodiment of the present invention, the windguard assembly may omit the roller, or may have a baffle in place of tines.

Figure 7:
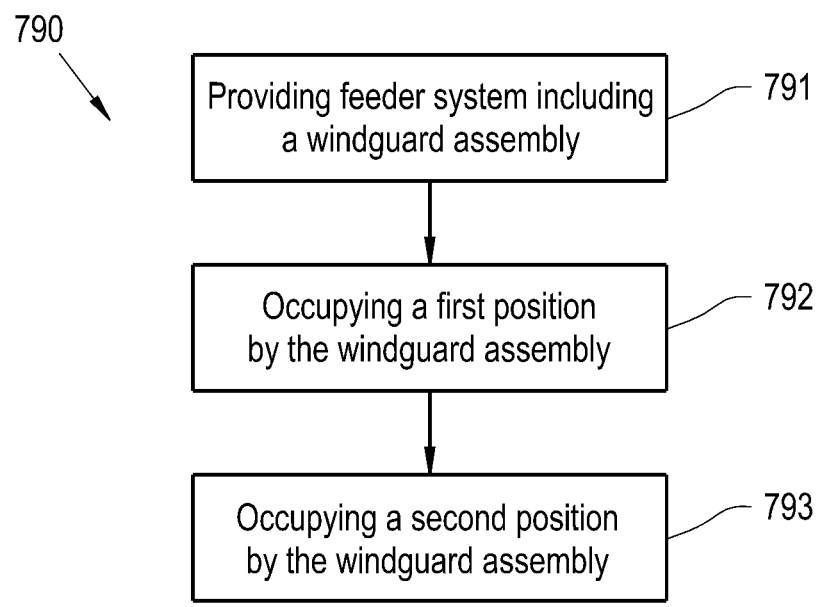
FIG. 7 illustrates a flow diagram showing a method of using an agricultural baler, in accordance with an exemplary embodiment of the present invention.

Referring now to FIG. 7, there is shown a flow diagram showing a method 790 of using an agricultural baler 101, 501, the method 790 including the steps of: providing 791 a baler frame 130 and a feeder system 108, 508, the feeder system 108, 508, being coupled with the baler frame 130 and including a windguard assembly 128, 528; occupying 792 selectively, by the windguard assembly 128, 528, a first position 237, 537, the first position 237, 537 being associated with a normal flow direction 132 of a crop material 136 relative to the feeder system 108, 508; and occupying 793 selectively, by the windguard assembly 128, 528 a second position 438, 638, the second position 438, 638 being associated with a reversal 133 of the normal flow direction 132 of the crop material 136. The feeder system 108, 528 can include a pickup assembly 111 and a rotary feeder assembly 121 each of which is coupled with the baler frame 130, the windguard assembly 128, 528 being coupled with the pickup assembly 111, the rotary feeder assembly 121 including a rotor device 144, the second position 438, 638 being associated with a reversed operation of the rotor device 144. The windguard assembly 128, 528 can include: a first arm 245, 545 pivotably coupled with the pickup assembly 111; a second arm 246, 546 pivotably coupled with the first arm 245, 545; an actuator 251, 551 pivotably coupled with the first arm 245, 545 and the second arm 246, 546 and configured for moving the second arm 246, 546 between a retracted position 257, 557 and an extended position 458, 658, the retracted position 257, 557 being associated with the first position 237, 537, the extended position 458, 658 being associated with the second position 438, 638; a tine mechanism 248, 548 pivotably coupled with the second arm 246, 546; a linkage assembly 250, 550 coupled with the first arm 245, 545 and the tine mechanism 248, 548 and configured for moving the tine mechanism 248, 548 between a down position 267, 567 and an up position 468, 668 when the second arm 245, 545 moves between the retracted position 257, 557 and the extended position 458, 658, respectively. The first arm 245 can include a proximal end 352, the actuator 251 including a proximal end 366 which is pivotably coupled with the proximal end 352 of the first arm 245. The first arm 545 can include a central section 569, the actuator 551 including a proximal end 552 which is pivotably coupled with the central section 569 of the first arm 545.

It is to be understood that the steps of method 790 may be performed by controller 115, 123 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by controller 115, 123 described herein, such as the method 790, is implemented in software code or instructions which are tangibly stored on a tangible computer readable medium. The controller 115, 123 loads the software code or instructions via a direct interface with the computer readable medium or via a wired and/or wireless network. Upon loading and executing such software code or instructions by controller 115, 123, controller 115, 123 may perform any of the functionality of controller 115, 123 described herein, including any steps of the method 790.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A windguard assembly for a feeder system of an agricultural baler, the agricultural baler including a baler frame, the feeder system being coupled with the baler frame, the feeder system including a pickup assembly, the windguard assembly comprising:
   a first arm configured to be pivotably coupled to the pickup assembly;
   a second arm pivotably coupled to the first arm;
   a roller rotatably coupled to the second arm;
   a tine mechanism pivotably coupled with the second arm;
   an actuator pivotably coupled with the first arm and the second arm and configured for moving the second arm between a retracted position associated with a first position of the roller and an extended position associated with a second position of the roller, the first position being associated with a normal flow direction of a crop material relative to the feeder system, the second position being associated with a reversal of the normal flow direction of the crop material; and a linkage assembly coupled with the first arm and the tine mechanism to move the tine mechanism between a down position and an up position when the second arm moves between the retracted position and the extended position, respectively.

2. The windguard assembly of claim 1, wherein the second position is associated with a reversed operation of a rotor device of a rotary feeder assembly, which is coupled with the baler frame.

3. The windguard assembly of claim 1, wherein the first arm includes a proximal end, the actuator including a proximal end which is pivotably coupled with the proximal end of the first arm.

4. The windguard assembly of claim 1, wherein the first arm includes a central section, the actuator including a proximal end which is pivotably coupled with the central section of the first arm.

5. An agricultural machine, comprising:
a machine frame; and
a feeder system coupled with the machine frame and including a pickup assembly and a windguard assembly, the windguard assembly comprising:
a first arm configured to be pivotably coupled to the pickup assembly;
a second arm pivotably coupled to the first arm;
a roller rotatably coupled to the second arm;
a tine mechanism pivotably coupled with the second arm;
an actuator pivotably coupled with the first arm and the second arm and configured for moving the second arm between a retracted position associated with a first position of the roller and an extended position associated with a second position of the roller, the first position being associated with a normal flow direction of a crop material relative to the feeder system, the second position being associated with a reversal of the normal flow direction of the crop material; and
a linkage assembly coupled with the first arm and the tine mechanism to move the tine mechanism between a down position and an up position when the second arm moves between the retracted position and the extended position, respectively.

6. The agricultural machine of claim 5, wherein the agricultural machine is an agricultural baler and the machine frame is a baler frame, the feeder system further including a rotary feeder assembly coupled with the baler frame, the rotary feeder assembly including a rotor device, the second position being associated with a reversed operation of the rotor device.

7. The agricultural machine of claim 5, wherein the first arm includes a proximal end, the actuator including a proximal end which is pivotably coupled with the proximal end of the first arm.

8. The agricultural machine of claim 5, wherein the first arm includes a central section, the actuator including a proximal end which is pivotably coupled with the central section of the first arm.

9. A method of using an agricultural baler, the method comprising the steps of:
providing a baler frame and a feeder system, the feeder system being coupled with the baler frame and including a pickup assembly and a windguard assembly, the windguard assembly comprising a first arm configured to be pivotably coupled to the pickup assembly, a second arm pivotably coupled to the first arm, a roller rotatably coupled to the second assembly, a tine mechanism pivotably coupled with the second arm, an actuator pivotably coupled with the first arm and the second arm and configured for moving the second arm between a retracted position associated with a first position of the roller and an extended position associated with a second position of the roller, the first position being associated with a normal flow direction of a crop material relative to the feeder system, the second position being associated with a reversal of the normal flow direction of material, and a linkage assembly coupled with the first arm and the tine mechanism to move the tine mechanism between a down position and an up position when the second arm moves between the retracted position and the extended position, respectively;
occupying selectively, by the roller, a first position, with the tine mechanism in the down position, the first position being associated with a normal flow direction of a crop material relative to the feeder system by moving the second arm into the retracted position; and
occupying selectively, by the roller, a second position, with the tine mechanism in the up position, the second position being associated with a reversal of the normal flow direction of the crop material by moving the second arm into the extended position.

10. The method of claim 9, wherein the feeder system includes a pickup assembly and a rotary feeder assembly each of which is coupled with the baler frame, the windguard assembly being coupled with the pickup assembly, the rotary feeder assembly including a rotor device, the second position being associated with a reversed operation of the rotor device.

11. The method of claim 9, wherein the first arm includes a proximal end, the actuator including a proximal end which is pivotably coupled with the proximal end of the first arm.

12. The method of claim 9, wherein the first arm includes a central section, the actuator including a proximal end which is pivotably coupled with the central section of the first arm.

* * * * *